United States Patent [19]

Groezinger et al.

[11] Patent Number: 4,620,580

[45] Date of Patent: Nov. 4, 1986

[54] TIRE COOLING BY FLUID TRANSFER ELEMENT

[75] Inventors: John J. Groezinger, Dunlap; Gene A. Anders, Peoria, both of Ill.

[73] Assignee: Caterpillar Inc., Peoria, Ill.

[21] Appl. No.: 474,656

[22] PCT Filed: Jan. 26, 1983

[86] PCT No.: PCT/US83/00128

§ 371 Date: Jan. 26, 1983

§ 102(e) Date: Jan. 26, 1983

[87] PCT Pub. No.: WO84/02885

PCT Pub. Date: Aug. 2, 1984

[51] Int. Cl.$^4$ ............................................. B60C 23/19
[52] U.S. Cl. ................................. 152/153; 152/DIG. 5
[58] Field of Search ............. 152/330 C, DIG. 5, 153; 165/44; 301/6 WB, 6 CP

[56] References Cited

U.S. PATENT DOCUMENTS

| | | |
|---|---|---|
| 1,038,092 | 9/1912 | Craig . |
| 1,956,739 | 5/1934 | Gollert ................................. 152/13 |
| 2,948,321 | 8/1960 | Mote ................................... 152/330 |
| 3,599,694 | 8/1951 | Bezbatchenko, Jr. .............. 152/153 |
| 3,675,699 | 7/1972 | Ocone ................................. 152/153 |
| 3,708,006 | 1/1973 | King ................................... 152/153 |
| 4,169,497 | 10/1979 | Tsunator ............................. 152/418 |
| 4,343,338 | 8/1982 | Hart .................................... 152/153 |

FOREIGN PATENT DOCUMENTS 2105193 4/1972 France .
419422 8/1974 U.S.S.R. .

Primary Examiner—Michael Ball
Attorney, Agent, or Firm—J. W. Burrows

[57] ABSTRACT

The cooling of a pneumatic tire (12) is provided for by a heat transfer element (21) contained within an inflation chamber (13) and drivingly coupled to the rim (14). The heat transfer element (21) extends away from the rim (14) into a volume of liquid coolant (19) also contained within the inflation chamber (13). Rotation of the rim (14) drives the heat transfer element (21) which transfers portions of the coolant (19) into contact with the rim (14) which conducts the heat away from the coolant fluid (19). A cooling coil (26) mounted about the rim (14) conducts the heat from the rim by the transfer of an additional coolant supply through the cooling coils (26). The efficient elimination of heat prolongs the life of the tire (12) and may increase productivity of earthmoving vehicles or the like which ride upon pneumatic tires (12) as operation of the vehicle need not be restricted in order to reduce heat damage to the tires (12).

4 Claims, 3 Drawing Figures

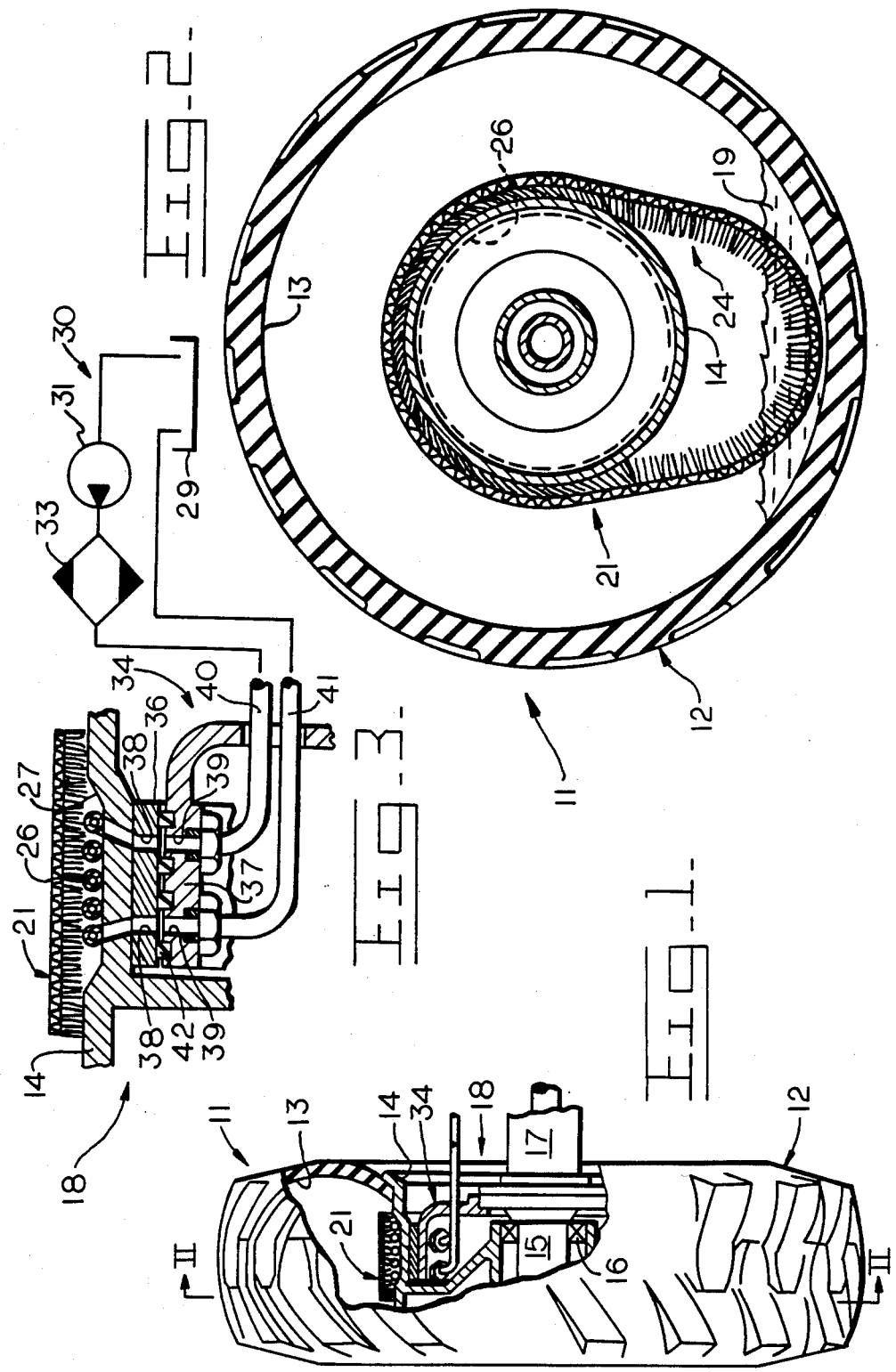

TIRE COOLING BY FLUID TRANSFER ELEMENT

TECHNICAL FIELD

This invention relates generally to vehicle wheels which include pneumatic tires and more particularly to the cooling of tires during operation.

BACKGROUND ART

The build up of heat which commonly occurs in pneumatic tires during operation can greatly accelerate deterioration of the tire. Heat has direct effects on the tire material and may also increase internal pressure to an undesirable level. In earthworking vehicles, which ride on large, costly tires, it is very often necessary to limit the rate of operation and thus the productivity of the vehicle as measured in ton miles per hour in order to reduce the effects of overheating on tires.

The adverse effects of heat on tires has been recognized by the prior art and a variety of cooling arrangements have heretofore been proposed.

A first type of cooling arrangement as proposed in the prior art is exemplified by U.S. Pat. No. 1,956,793, issued May 1, 1934 to R. Gollert, or by U.S. Pat. No. 2,948,321, issued Aug. 8, 1960 to L. C. Mote, or by U.S. Pat. No. 3,708,006, issued Jan. 2, 1973 to Calvin J. King. Cooling arrangements of this type rely on thermal conductors in the tire inflation chamber which extend from the tread region where heat is primarily generated to the rim on which the tire is mounted. The metallic rim then conducts heat away from the interior of the tire. In some cases, a quantity of liquid is provided within the tire inflation chamber to aid in heat transfer from the tire material to the thermal conductors.

In another category of tire cooling arrangements exemplified by U.S. Pat. No. 1,038,092, issued Sept. 10, 1912 to A. B. Craig, or U.S. Pat. No. 1,049,677, issued Jan. 7, 1913 also to A. B. Craig, liquid coolant contained in the inflation chamber or an inner tube is pumped to heat radiating cooling coils situated at the hub of the wheel by a pump which is driven by wheel rotation.

In still another type of prior tire cooling arrangement as described in U.S. Pat. No. 3,414,036, issued Dec. 3, 1968 to F. O. Skidmore, structures situated within the inflation chamber or formed on the inner surface of the tire itself has a configuration which increases the circulation of air or of liquid coolant or a high conductivity gas contained within the inflation chamber. Great Britain patent specification No. 1,377,489 of Douglas Bulgin discloses a variation of this type of cooling arrangement in which a volatile liquid contained within the tire is transmitted through conduits to a cooling condenser at the hub of the wheel and then returned to the inflation chamber.

Some of these prior cooling arrangements require various substantial structural changes in the tire itself and/or substantial complications of the wheel assembly as a whole. Consequently, the gains in heat elimination from the tire may possibly not be sufficient to justify the cost and complications involved. In any case it appears that prior arrangements of these types of eliminating heat from tires have not been extensively adopted by the industry. The adverse effects of heat build up on tires have continued to be a very serious problem.

The present invention is directed to overcoming one or more of the problems as set forth above.

DISCLOSURE OF THE INVENTION

In one aspect of the present invention there is provided a vehicle wheel having a rotatable rim, a tire mounted on the rim, the tire and rim defining an inflatable chamber, and a volume of liquid coolant located in the inflation chamber and comprising a flexible fluid transfer element including fluid transfer means for transferring fluid from the volume of liquid coolant to the rim, the fluid transfer element being drivingly connected to the rim and in contact with the volume of liquid coolant.

The heat is efficiently transferred from the region of the tire tread to the rim through the cooling fluid and the strip of material that is in communication with the coolant fluid and the rim. This invention can be economically adapted to existing vehicle wheels as well as to newly manufactured wheels. The highly efficient removal of heat from the inflation chamber prolongs the life of the tire and, in the case of certain earthworking vehicles or the like, will increase the productivity of the vehicle as measured in ton-miles per hour of the vehicle operation since operation need not be restricted for the purpose of avoiding tire damage from overheating.

BRIEF DESCRIPTION OF THE DRAWINGS

FIG. 1 is an elevational view in partial cross section of a vehicle wheel in accordance with an embodiment of the present invention;

FIG. 2 is a sectional view of the vehicle wheel of FIG. 1 taken along line II—II thereof; and FIG. 3 is a more detailed enlarged sectional view of a portion of the wheel of FIG. 1.

BEST MODE FOR CARRYING OUT THE INVENTION

Referring to FIGS. 1 and 2 of the drawings in conjunction, a vehicle wheel 11 includes a pneumatic tire 12 which has an inflation chamber 13 and which is mounted on an annular rotatable rim 14. The rim 14 is journalled to a nonrotatable hub structure 15 by a wheel bearing 16 and the hub structure 15 is connected to an axle housing 17. The tire 12 may be of a known design and the rim 14, hub structure 15, axle housing 16 and associated elements may also be of known constructions except that some embodiments of the present invention may include means 18 for cooling the rim as will hereinafter be described in more detail.

A volume of liquid coolant 19 is situated in the inflation chamber 13 of the tire 12. The volume of the coolant is such that the top of the coolant level is below the rim 14. The coolant 19 may be any of a number of liquids capable of receiving and retaining heat generated within the tire material. Ethylene glycol, being one preferred example, has a high specific heat and is non-corrosive both to the tire material and the metallic material of the rim.

A flexible fluid transfer element 21 is located within the inflation chamber 13. The flexible fluid transfer element 21 is preferably a continuous belt which encircles the hub of the rim 14 and extends downwardly into the coolant 19. The belt 21 is drivingly connected to the rim 14 by the frictional engagement of the belt 21 with the hub of the rim 14. The belt 21 includes a fluid transfer means 24 for transferring fluid from the volume of liquid coolant 19 to the rim 14. The fluid transfer means 24 in this embodiment is provided by forming the belt 21 of a porous flexible fabric. In this example, the belt 21 is formed from a strip of pile carpeting material although other flexible materials having openings or porosities which will retain liquid may also be used in place of the porous fabric of this particular example. The belt 21 could also be formed at least in part of a liquid absorbent material. Alternatively, the flexible fluid transfer element 21 could be a strip of material having one end drivingly connected to the rim 14.

A considerable greater degree of cooling may be realized by providing further elements, such as the cooling means 18, for more efficiently removing heat from the rim 14 itself. This may take a variety of forms depending on the severity of the tire heating problem in a particular type of vehicle. For example, cooling fins can be provided on the inside surface of the wheel rim 14 to increase air circulation as the wheel rotates. Under more severe conditions, such as in this example, cooling means 18 is provided for direct extraction of heat from the coolant 19 by circulating an additional fluid coolant through a cooling coil 26 mounted on the rim 14.

Referring now to FIG. 3 in conjunction with FIG. 1, the rim 14 of this particular example has an annular groove 27 in the surface of the rim which faces the inflation chamber 13. The cooling coil 26 is located within the groove 27. It is recognized that the cooling coil 26 may be situated elsewhere on the rim 14 including outside of the inflation chamber 13. Since the metallic material of the rim is typically an excellent thermal conductor, good heat transfer will still be realized.

A reservoir 29 contains an additional coolant supply 30 and a pump 31 draws the coolant fluid from the reservoir 29 and directs the coolant through a cooler 33 to the coil 26 and returns the coolant fluid to the reservoir 29. The additional coolant supply 30 could also be supply from a refrigeration system, not shown.

A means 34 is provided for transmitting the additional fluid coolant between the hub structure 15 and the coolant coil 26. The transmitting means 34 includes coaxial outer and inner members 36,37 respectively. The outer member 36 is secured to the wheel rim 14 for rotation therewith while the inner member 37 is secured to the nonrotatable axle housing 17. Passages 38 are located in the outer rotatable member 36 and communicate with the ends of the coil 26 while passages 39 are located in the inner nonrotating member 37 and communicate with coolant receiving and return lines 40 and 41 respectively. Four spaced apart annular seals 42 are located between the outer and inner members 36 and 37 to enable communication between the passages 38 and 39 of the transmitting means 34 without leakage. Other forms of coupling may also be used to transmit fluid between the rotatable and nonrotatable portions of the above-described structure without departing from the essence of this invention.

The wheel having a continuous belt of a porous material such as a carpeting element that extends into the coolant and continuously transfers coolant to the rim for dissipation of heat therefrom is the preferred embodiment of the invention. Additional tire cooling is achieved by the addition of a means for transferring coolant through a cooling coil located on the rim.

INDUSTRIAL APPLICABILITY

The invention may be utilized in any of a variety of vehicle wheel constructions of the general type which includes a tire 12 having an inflation chamber 13. In operation, the coolant 19 in the inflation chamber 13 absorbs heat from the tread and adjacent sidewall regions of the tire 12. The rotational movement of the wheel 11 in operation drives the continuous heat transfer belt 21 which carries portions of the heated coolant 19 into contact with the rim 14 where such heat is transferred into the separate liquid coolant in coil 26 and subsequently to the reservoir 32 and cooler 33 by the pumping action of the pump 31.

The portion of the coolant 19 within the inflation chamber 13, which is carried into contact with the rim 14 and cooled in the above-described manner, is returned to the coolant volume 19 of the inflation chamber 13 in part within the belt itself and in part by falling or being thrown outwardly by centrifugal force. It should be recognized that during operation of the wheel, the speed of rotation is slow enough that the coolant 19 remains substantially at the bottom of the wheel.

If the vehicle wheel 11 operates on rough terrain, some additional and more direct transfer of heat from the coolant 19 to the rim 14 may occur as a result of splashing. In addition to the basic mode of heat transfer provided by the belt as discussed above, the presence of the belt tends to accentuate such splashing and thus may provide an additional more direct mode of heat transfer under some conditions.

It is to be recognized that various types of materials could be used in various orientations relative to the rim 14 without departing from the essence of this invention.

Since the heat transfer belt 21 is relatively light in comparison with the mass of the vehicle wheel as a whole and a large quantity of coolant is not needed for efficient heat transfer, the invention need not be a costly addition to a vehicle wheel nor cause any sizeable reduction of fuel efficiency. By the addition of the cooling belt 21 and the cooling coil 26, a very inexpensive and efficient tire cooling arrangement is provided.

Other aspects, objects and advantages of this invention can be obtained from a study of the drawings, the disclosure and the appended claims.

We claim:

1. In a vehicle wheel (11) having a rotatable rim (14), a tire (12) mounted on the rim (14), said tire and rim defining an inflation chamber (13), and a volume of liquid coolant (19) located in the inflation chamber (13), the improvement comprising:
   a flexible fluid transfer belt (21) produced from a strip of material (21) formed of a porous flexible fabric and operable to carry fluid solely in response to rotation of said wheel from said volume of liquid coolant to said rim, said fluid transfer belt (21) being drivingly connected to said rim (14) by frictional engagement and is free to move thru said volume of liquid coolant (19) relative to the inside surface of the tire.

2. The vehicle wheel (11), as set forth in claim 1, wherein said fluid transfer belt (21) is formed at least in part of a liquid absorbent material.

3. The vehicle wheel (11), as set forth in claim 1, including a coolant circulating coil (26) mounted on said rim (14) and a pump (31) for circulating a separate fluid coolant through said coil (26).

4. The vehicle wheel (11), as set forth in claim 3, including a nonrotatable hub structure (15), said hub structure being in fluid communication with said pump (31) and having a means (34) for transmitting said separate fluid coolant between said hub structure (15) and said coolant coil (26).

* * * * *